United States Patent Office 2,821,240
Patented Jan. 28, 1958

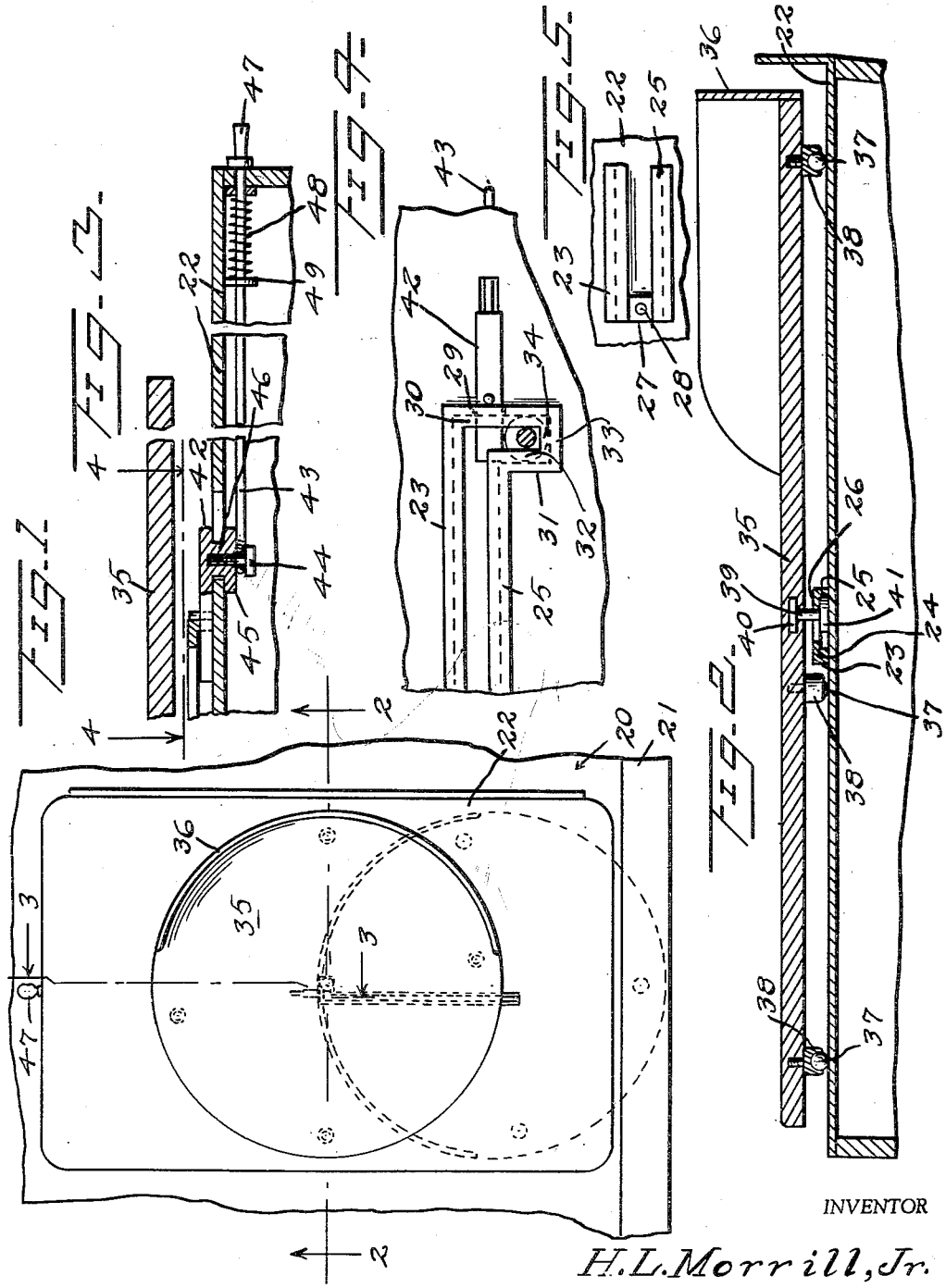

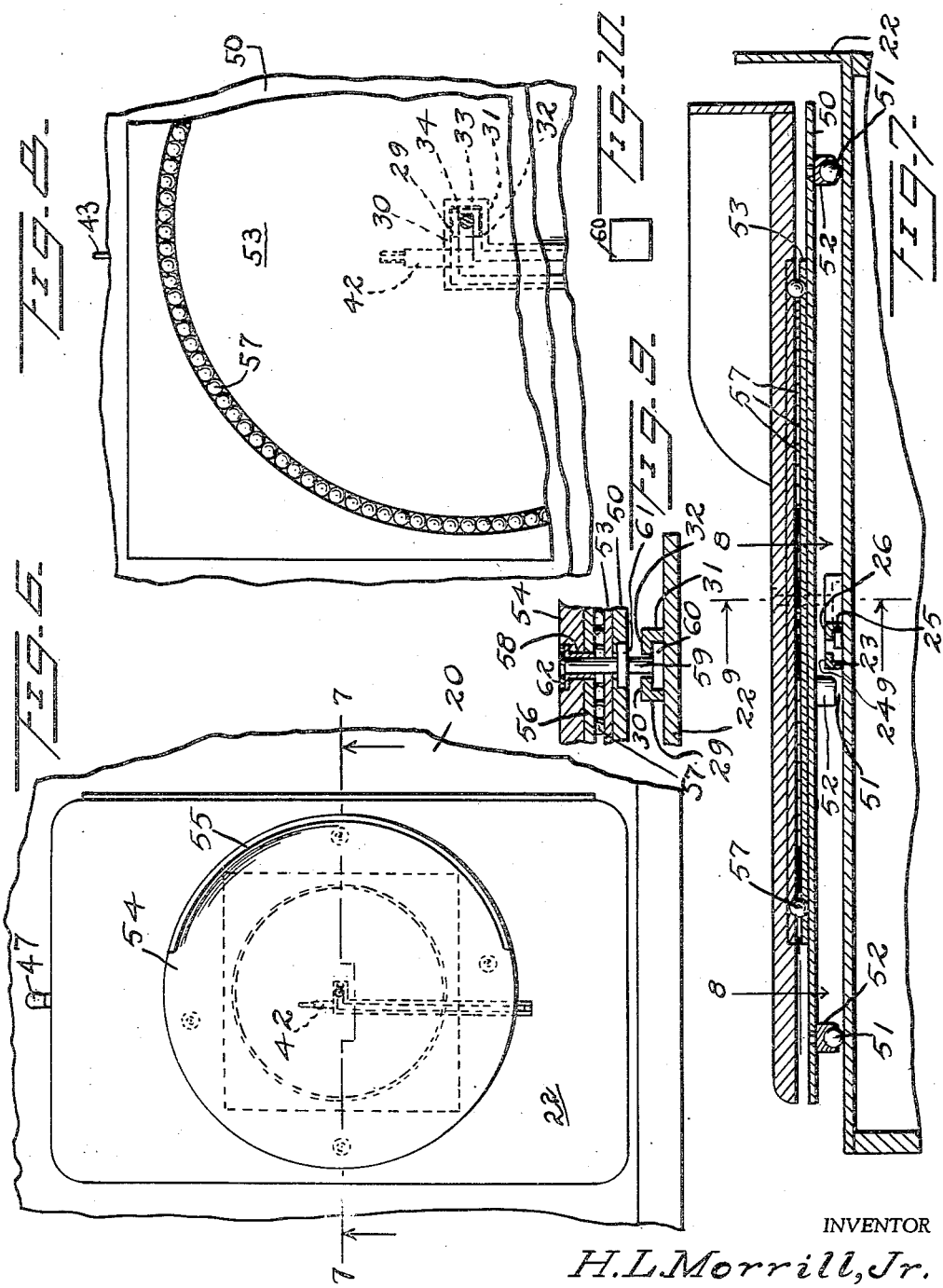

2,821,240

VEHICLE SEAT

Harry L. Morrill, Jr., Atlanta, Ga.

Application August 11, 1955, Serial No. 527,823

3 Claims. (Cl. 155—14)

The present invention relates to automobile seats, and more particularly to automobile seats which can be revolved on a vertical axis and slide sideways toward the vehicle door.

The primary object of the invention is to provide an automobile seat which, by turning toward the doorway and sliding toward the doorway, assists the occupant in boarding and alighting from the vehicle.

Another object of the invention is to provide a structure of the class described which will be supported in such a manner that no tilting of the seat out of the horizontal plane will take place.

A further object of the invention is to provide a structure for guiding a vehicle seat in a lateral path toward the door of the vehicle.

A still further object of the invention is to provide a seat of the class described above in which means are provided for locking the seat in normal position.

Other objects and advantages will become apparent in the following specification when considered in the light of the attached drawings, in which:

Figure 1 is a plan view of the invention shown attached to a vehicle with parts broken away;

Figure 2 is an enlarged longitudinal cross-section, taken along the line 2—2 of Figure 1, looking in the direction of the arrows;

Figure 3 is an enlarged fragmentary transverse cross-section, taken along the line 3—3 of Figure 1, looking in the direction of the arrows;

Figure 4 is a fragmentary horizontal cross-section, taken along the line 4—4 of Figure 3, looking in the direction of the arrows;

Figure 5 is a fragmentary plan view of the outer end of the guideway;

Figure 6 is a plan view of a modified form of the invention shown attached to a vehicle with parts broken away;

Figure 7 is an enlarged longitudinal cross-section, taken along the line 7—7 of Figure 6, looking in the direction of the arrows;

Figure 8 is a horizontal cross-section, taken along the line 8—8 of Figure 7, looking in the direction of the arrows;

Figure 9 is an enlarged fragmentary transverse cross-section, taken along the line 9—9 of Figure 7, looking in the direction of the arrows, and Figure 10 is a bottom plan view of the guide pin.

Referring now to the invention disclosed in Figures 1 through 5, the reference numeral 20 indicates generally a motor vehicle shown schematically with a door at 21 providing access to and from the vehicle. A seat base 22 mounted to the vehicle 20 in any convenient manner which permits longitudinal adjustment of the seat to adapt the seat to the height of the driver.

The seat base 22 has an upstanding flange 23 having an inturned upper member 24. A second flange 25 having an inturned member 26 is positioned in spaced-apart parallel opposed relation to the flange 23. Flanges 23 and 25 have a rectangular stop member 27 positioned therebetween at their outer ends. Stop member 27 is releasably secured to the base 22 by means of a screw or bolt 28. The inner end of the flange 23 is provided with a right, angularly extending flange 29 having an inturned upper portion 30 secured thereto. The inner end of the flange 25 is provided with a right, angularly extending flange portion 31 having an inturned upper portion 32. The flanges 29 and 31 extend parallel to each other with the inturned portions opposed and spaced apart. A flange 33, having an inturned portion 34, connects the rear ends of the flanges 29 and 31.

A seat 35 has a back element 36 extending upwardly therefrom and is supported on a multiplicity of ball bearings 37 mounted in sockets 38 on the underside of the seat 35, with the ball bearings 37 in contact with the upper face of the base 22. A guide pin 39 is provided with a head 40 which is secured by any suitable means to the seat 35, and a second spaced-apart head 41 which is positioned between the flanges 23, 25 or 29, 31 with the head 41 engaged under the inturned portions 24, 26 or 30, 32. A lock bolt 42 is positioned so as to engage across under the inturned portions 30, 32 from the flange 29 to the flange 31 to form a pocket to retain the head 41 of the guide pin 39, as is illustrated in Figure 4.

The lock bolt 42 is secured to an operating rod 43 by means of a screw connector 44 and spacer washers 45 and 46. A handle 47 is connected to the operator rod 44, and a spring 48 pressing against stop 49 normally urges the operating rod 43 and the lock bolt 42 to locked position.

In the use and operation of the invention disclosed in Figures 1 through 5, when the occupant of the seat desires to exit from the vehicle, he releases the lock bolt 42 by pulling on the operator handle 47 and hunches the seat forward until the guide pin 39 is aligned between the flanges 23 and 25, whereupon by swinging his body he moves the seat toward the door of the vehicle and the guide pin 39 reaches the stop 27, and then by moving his legs toward the door the seat 35 is caused to turn on the base 22 so that the back 36 of the seat 35 is moved to a position approximately 90° forward of its normal position. This permits the user to engage his feet directly with the ground to alight from the vehicle. In boarding the vehicle the reverse procedure is followed.

In the modification illustrated in Figures 6 through 10, the vehicle 20 is provided with a seat base 22 which is secured to the vehicle in the same manner as the seat base 22 illustrated in the preferred form of the invention in Figures 1 through 5. The base 22 is likewise provided with a pair of upstanding flanges 23 and 25 which carry inturned portions 24 and 26 in the same manner as the guideway illustrated in Figure 1. An offset portion to the guideway is provided by the flanges 29, 31 and 33 with their inturned portions 30, 32 and 34 all in the same manner as is illustrated in Figure 1.

A table 50 is mounted above the seat base 22 with roller bearings 51 engaging the upper face of the base 22 and held to the table 50 by means of socket members 52. The upper face of the table 50 carries a lower race 53. A seat 54 having a back 55 carries the upper race 56 on the lower side thereof, and the races 53 and 56 have ball bearings 57 positioned therebetween. The upper seat 54 carries a vertically extending central sleeve 58 and a guide pin 59 is extended through the table 50, the race 53, the race 56 and the sleeve 58. A head 60 is positioned on the lower end of the guide pin 59 and is formed square to engage the outer faces of the guideway between the flanges 23 and 25 to prevent the guide pin 59 from turning therein. A head 61 is formed on the guide pin 59 spaced apart from the head 60 and is secured to the table 50 by imbedding therein or other suitable means to lock the guide pin 59 to the table 50, preventing relative rotation therebetween. The upper end of the guide pin 59 carries a separable head 62 which secures the guide pin 59 to the seat 54, permitting relative rotation therebetween.

The lock bolt 42 is provided for locking the guide pin 59 in its innermost position in the same manner as the lock bolt 42 locks the guide pin 39 in the device as illustrated in Figure 1.

In the use and operation of the invention illustrated in Figures 6 through 10, the lock 42 is released in the same manner as previously indicated for the preferred form of the invention, and the seat structure is hunched forward to align the guide pin 59 with the guideway. The seat is then moved laterally toward the door of the vehicle until the end of the guideway is reached, whereupon the seat is revolved by moving the legs of the user out of the car to permit him to alight from the car with a minimum of effort. It should be noted here that the ball bearings 51 provide an antifriction lateral support for the seat 54, while the ball bearings 57 with the races 53 and 56 provide a turntable for the relative rotation of the seat 54 with the base 22.

Having thus described the preferred embodiments of the invention, it should be understood that numerous modifications and structural adaptations may be resorted to without departing from the scope of the appended claims.

What is claimed is:

1. A vehicle seat comprising a generally horizontal flat base, an elongated slotted transverse straight guideway secured to the upper surface of said base in upwardly projecting relation thereto, an angularly offset straight guideway extending perpendicularly laterally from one end portion of said transverse guideway and forming a lateral extension thereof, a seat, means on said seat supporting said seat on said base for sliding and rotational movement thereon, a guide pin secured to and depending from said seat into said guideway whereby said seat is guided by said guideway, and means for releasably locking said guide pin in said angularly offset guideway at the end of said transverse guideway.

2. A device as claimed in claim 1, wherein said means supporting said seat includes ball rollers engaging said base.

3. A device as claimed in claim 1, wherein said seat supporting means includes a bearing supported turntable and bearing supports spacing said turntable from said base.

References Cited in the file of this patent

UNITED STATES PATENTS

| | | |
|---|---|---|
| 824,393 | Vogel | June 26, 1906 |
| 1,188,706 | Wall | June 27, 1916 |
| 1,807,579 | Thompson | May 26, 1931 |
| 1,916,346 | Toncray et al. | July 4, 1933 |
| 2,499,972 | Repko | Mar. 7, 1950 |
| 2,691,174 | Harrison | Oct. 12, 1954 |

FOREIGN PATENTS

| | | |
|---|---|---|
| 160,697 | Great Britain | Mar. 31, 1921 |
| 492,492 | Great Britain | Sept. 21, 1938 |
| 508,017 | Great Britain | June 22, 1939 |